United States Patent

Akatsu et al.

[15] 3,706,003

[45] Dec. 12, 1972

[54] HIGH VOLTAGE REGULATING CIRCUIT

[72] Inventors: Mitsuharu Akatsu; Tomoo Kinoshita, both of Yokohama; Tadahiko Iwasaki, Kamakura, all of Japan

[73] Assignee: Hitachi, Ltd., Tokyo, Japan

[22] Filed: May 27, 1970

[21] Appl. No.: 40,857

[30] Foreign Application Priority Data

May 30, 1969 Japan ......................44/41679

[52] U.S. Cl. ...................315/18, 315/22, 315/27 TD

[51] Int. Cl. .............................................H01j 29/70

[58] Field of Search ......................315/18, 22, 27 TD

[56] References Cited

UNITED STATES PATENTS 3,375,436 3/1968 Denton........................315/22

3,350,599 10/1967 Rickling......................315/22

3,445,717 5/1969 Eckenbrecht...............315/22

*Primary Examiner*—Benjamin A. Borchelt

*Assistant Examiner*—S. C. Buczinski

*Attorney*—Craig, Antonelli, Stewart & Hill

[57] ABSTRACT

A high voltage regulating circuit has a cathode ray tube, high voltage generating means connected with the anode of the cathode ray tube and comprising a flyback transformer and a voltage rectifier, a shunt regulating tube whose plate is connected with the anode of the cathode ray tube, and high voltage current responsive means. The high voltage current responsive means is connected with the high voltage generating means for generating a control signal proportional to the high voltage current flowing through the high voltage generating means. The control signal is supplied to the grid of the shunt regulating tube to control the plate current thereof, so that the anode voltage of the cathode ray tube is kept constant.

6 Claims, 5 Drawing Figures

INVENTORS
MITSUHARU AKATSU, TOMOO KINOSHITA
AND TADAHIKO IWASAKI
BY Craig, Antonelli, Stewart & Hill
ATTORNEYS INVENTORS
MITSUHARU AKATSU, TOMOO KINOSHITA
AND TADAHIKO IWASAKI
BY Craig, Antonelli, Stewart & Hill
ATTORNEYS

HIGH VOLTAGE REGULATING CIRCUIT

BACKGROUND OF THE INVENTION

1. Field of the Invention

The particularly, invention relates to a high voltage regulating circuit adapted to maintain constant the high voltage supplied to the anode of a cathode ray tube, and more particularly to a high voltage regulating circuit employing a shunt regulating tube to maintain such a high voltage at a predetermined value. The present invention further relates to a high voltage regulating circuit incorporating a beam current limiting circuit such that the beam current in a cathode ray tube is prevented from increasing beyond the control range of the high voltage regulating circuit to cause a decrease in the high voltage.

2. Description of the Prior Art

The high voltage supplied to the anode of a cathode ray tube in a color television receiver is derived by stepping up a flyback pulse generated in a horizontal deflecting output circuit through a horizontal output transformer circuit and then subjecting this to rectification. Since the anode voltage of a cathode ray tube in a color television receiver is higher than in the case of a black-and-white television receiver and the direct current components of video signals are transmitted, there take place considerable variations in the average anode current depending on the nature of the video signals. Therefore, if the high voltage is not stabilized or maintained at a predetermined value, considerable variations in the high voltage take place, thereby giving rise to variations in the operation of the horizontal deflecting circuit, changes in the raster amplitude, deteriorations in focusing, deviations in convergence and the like.

In the past, a high voltage regulating circuit has been employed having a shunt regulating tube connected in parallel with the anode of a cathode ray tube. In this circuit, the current shunted through the shunt regulating tube is changed to compensate for variations in the anode current of the cathode ray tube so that the load on a high voltage generating circuit is maintained constant to thereby stabilize the high voltage.

FIG. 1 is a circuit diagram showing a prior art high voltage regulating circuit employing a shunt regulating tube of the type described above. In this figure, numeral 1 designates a horizontal output tube, 2 a flyback transformer, 3 a damper tube, 4 a boosting capacitor, 5 a horizontal deflecting coil, 6 a high voltage rectifier tube, 7 a color cathode ray tube, 8 a shunt regulating tube, 9 and 10 a resistor and a variable resistor for dividing the boost voltage supplied to the grid of the shunt regulating tube 8, 11 a bypass capacitor, 12, 13 and 14, red, blue and green video signal output circuits, 15 a grid bias power source, 16 a screen voltage control circuit, 17 a variable resistor for adjusting the focusing voltage.

This circuit as well as its operation is already well-known and therefore only the essential points will be discussed hereunder.

As the anode current (beam current) in the color cathode ray tube 7 increases, the load on the horizontal deflecting circuit increases with a resultant drop in the high voltage (anode voltage). On the other hand, an increase in the anode current results in an increased discharge of the charge stored in the boosting capacitor

4 so that the potential difference across the boosting capacitor 4 decreases. Consequently, the voltage at the junction point of the boosting capacitor 4 and the flyback transformer 2 decreases. This voltage is divided by the resistor 9 and the variable resistor 10 and it is then supplied to the grid of the shunt regulating tube 8. This in turn reduces the voltage at the grid of the shunt regulating tube 8 with the result that the high voltage current shunted to the shunt regulating tube 8 is decreased to control an increase in the high voltage load, thereby maintaining constant the high voltage.

With the circuit just described, the average high voltage current is adjusted by changing the value of the variable resistor.

Now in this circuit, the change $\Delta E_{HT}$ of the high voltage $E_{HT}$ with respect to the change $\Delta I_A$ of the anode current $I_A$ may be generally given by the following equation:

$$\frac{\Delta E_{HT}}{\Delta I_A}=\frac{R_S}{1+\frac{R_S}{r_P}\left(1+\mu\frac{K^{R_G}}{R_1+R_G}\right)} \qquad (1)$$

where $R_G = \Delta E_{HT}/\Delta I_{HT}$ is the internal resistance of the high voltage generating circuit; $\Delta I_{HT}$ = the change of the average high voltage current $I_H$; $r_p$ = the internal resistance of the shunt regulating tube 8; $\mu$ = the voltage amplification factor of the shunt regulating tube 8; $K = \Delta E_{BB}/\Delta E_{HT}$ is the regulation ratio between the boost voltage and the high voltage; $E_{BB}$ = the boost voltage; $R_1$ = the resistance value of the resistor 9; $R_G$ = the resistance value of the variable resistor 10.

Furthermore, since $\Delta E_{HT} = R_S \times \Delta I_{HT}$, the change $\Delta I_{HT}$ of the high voltage current $I_{HT}$ at the time when the anode current $I_A$ of the cathode ray tube 7 has changed to $\Delta I_A$ is given by the equation:

$$\Delta I_{HT}=\frac{\Delta I_A}{1+\frac{R_S}{r_P}\left(1+\mu\frac{K^{R_S}}{R_1+R_G}\right)} \qquad (2)$$

Consequently, as compared with the case where the shunt regulating tube 8 is not employed, the change $\Delta I_{HT}$ of the high voltage current $I_{HT}$ is reduced to:

$$1/\left\{1+\frac{R_S}{r_P}\left(1+\mu\frac{K^{R_G}}{R_1+R_G}\right)\right\}$$

In this manner, with the prior art high voltage regulating circuit shown in FIG. 1 the boost voltage is supplied to the grid of the shunt regulating tube 8 so that variations in the high voltage current are better controlled as compared with a high voltage circuit employing no high voltage regulating circuit. However, this prior art circuit involves the following drawbacks:

1. It cannot be used with transistorized television receivers. In other words, when a transistor is employed to form a horizontal deflecting circuit, a low voltage may effectively be supplied to a horizontal output transistor so that there is no need to employ any boosting capacitor so as to increase the voltage supplied to the horizontal output transistor. Hence, no booster circuit is needed. Even if a booster circuit were used, the impedance between the collector and emitter of the horizontal output transistor would be negligibly small as compared with the impedance between the plate and cathode of a horizontal output tube with the result that the voltage across the boosting capacitor would not practically change for variations in the high voltage or high current. Thus, the prior art high voltage regulating circuit cannot be used with transistorized television receivers.

2. The boost voltage varies depending on the characteristics of the horizontal output tube 1 and the damper tube 3. Consequently, as the characteristics of the horizontal output tube 1 and the damper tube 3 change due to the ambient temperature or with time, the boost voltage changes with the resultant variation in the high voltage.

3. As explained in the above 2, the boost voltage varies due to changes in the characteristics of the horizontal output tube 1 and the damper tube 3 and will not necessarily be proportional to a change in the high voltage, that is, $E_{BB}/E_{HT}$ will not always remain constant. Thus, it is impossible to properly control the high voltage with the boost voltage.

4. Since the gain of a negative feedback loop in the high voltage regulating circuit cannot be made large enough, it is impossible to effect a proper control. In other words, a change in the anode current results in a considerable degree of variation in the high voltage. While the control sensitivity of the high voltage regulating circuit can be improved by reducing the value of the resistor 9, the voltage supplied to the grid of the shunt regulating tube 8 must be lower than the cathode voltage $E_B$ so that the value of the resistor 9 cannot be made very small. Furthermore, the reduced value of the resistor 9 reduces the control range with a consequent decrease in the anode current. For this reason, the resistor 9 and the variable resistor 10 are usually selected such that they have substantially the same values. Thus, since the gain of the negative feedback loop in the high voltage regulating circuit shown in FIG. 1 cannot be made very large, the control sensitivity is not good.

5. Due to the limited gain of the negative feedback loop in the prior art high voltage regulating circuit shown in FIG. 1 as explained in the above 4, the high voltage tends to vary under the influence of fluctuations or changes with time (reduced emission) in the characteristics of the shunt regulating tube 8.

In addition to the high voltage regulating circuit shown in FIG. 1, there has been proposed a high voltage regulating circuit in which the varying high voltage is directly divided by an extra-high resistor (over 100 megohms) to provide a grid control voltage for the shunt regulating tube. However, this circuit has not virtually been put to practical use since the extra-high voltage resistor connected between the high voltage and the grid of the shunt regulating tube is expensive, and at the same time such a resistor is subject to frequent troubles so that stable ones are not readily available.

SUMMARY OF THE INVENTION:

An object of the present invention is to provide a novel and useful high voltage regulating circuit to maintain the high voltage of a cathode ray tube constant, which is adapted to be incorporated in a color television receiver or other cathode ray tube circuits.

Another object of the present invention is to provide an inexpensive high voltage regulating circuit.

A further object of the present invention is to provide a highly stable and reliable high voltage regulating circuit which overcomes the deficiencies of prior art high voltage regulating circuits utilizing a boost voltage as the control voltage for a shunt regulating tube and in which a control signal corresponding to variations in the high voltage current is employed to control the high voltage for a cathode ray tube.

According to one characteristic feature of the present invention, there is provided a high voltage regulating circuit comprising a cathode ray tube having at least a cathode, a grid and an anode; high voltage generating means connected with the said anode and comprising a flyback transformer for generating a flyback pulse and a high voltage rectifier for rectifying the flyback pulse generated across the transformer so that a high DC voltage is supplied to the anode of the cathode ray tube; current responsive means connected with the high voltage generating means for generating a control signal proportional to the current flowing through the generating means; a control means having an input terminal, an output terminal connected with the anode of the cathode ray tube and a common terminal connected with a reference potential; and means for supplying the control signal to the input terminal of the control means for controlling current flow through the output terminal thereof, thereby the high DC voltage supplied to the anode of the cathode ray tube is kept constant.

With the arrangement described above, the control signal for the high voltage regulating circuit is obtainable in the form of a control signal proportional to the high voltage current such that it can be used with a transistorized horizontal deflection circuit employing no booster circuit.

Since the control signal employed in this arrangement varies only according to the high voltage current and is not influenced by changes in the characteristics of a horizontal output tube (transistor) and a damper tube (diode) due to ambient temperature changes or with time, the high voltage can be accurately controlled.

Furthermore, according to the arrangement the gain of a negative feedback loop can be made sufficiently large because a proper control signal is always obtainable by virtue of the fact that the control signal varies according to the high voltage current only and because such an adequate control signal can be applied to the input terminal of the control means by changing both the impedance of the current responsive means and the power source voltage. Consequently, a good high voltage regulating performance is ensured and the high voltage does not practically change for fluctuations or changes with time in the characteristics of the control means.

According to another characteristic feature of the present invention, there is provided a high voltage regulating circuit comprising a cathode ray tube having at least a cathode, a grid and an anode; high voltage generating means connected with the anode and comprising a flyback transformer for generating a flyback pulse and a high voltage rectifier connected with the flyback transformer for rectifying the flyback pulse generated across the transformer so that a high DC voltage is supplied to the anode of the cathode ray tube; current responsive means connected with the high voltage generating means for generating a control signal proportional to the current flowing through the generating means; control means having an input terminal, an output terminal connected with the anode of the cathode ray tube and a common terminal connected with a reference potential; first means for supplying said control signal to the input terminal of the control means for controlling current flow through the output terminal thereof so as to keep the high DC voltage at a constant value; and second means for supplying the control signal to the grid of the cathode ray tube to prevent the beam current flowing through the anode from exceeding a predetermined value.

The arrangement described above is an improvement on the first-mentioned arrangement of the circuit of the present invention, wherein the anode current is prevented from increasing beyond the control range of the high voltage regulating circuit to cause a decline in the high voltage. While the high voltage and the high voltage current remain constant producing a constant control voltage so far as the anode current is within the control range, the high voltage declines with a consequent increase in the high voltage current when the anode current increases in excess of a predetermined value, that is, beyond the control range of the high voltage regulating circuit. Thus, the control signal generating circuit delivers at the output thereof a control voltage which increases toward the negative direction.

According to the present arrangement, this voltage increasing toward the negative direction is applied to the grid of the cathode ray tube so that a drop in the high voltage may be prevented by keeping the anode current from increasing beyond a predetermined value.

DESCRIPTION OF THE PREFERRED EMBODIMENTS:

One embodiment of the present invention shown in FIG. 2 will now be explained.

Figure 2:
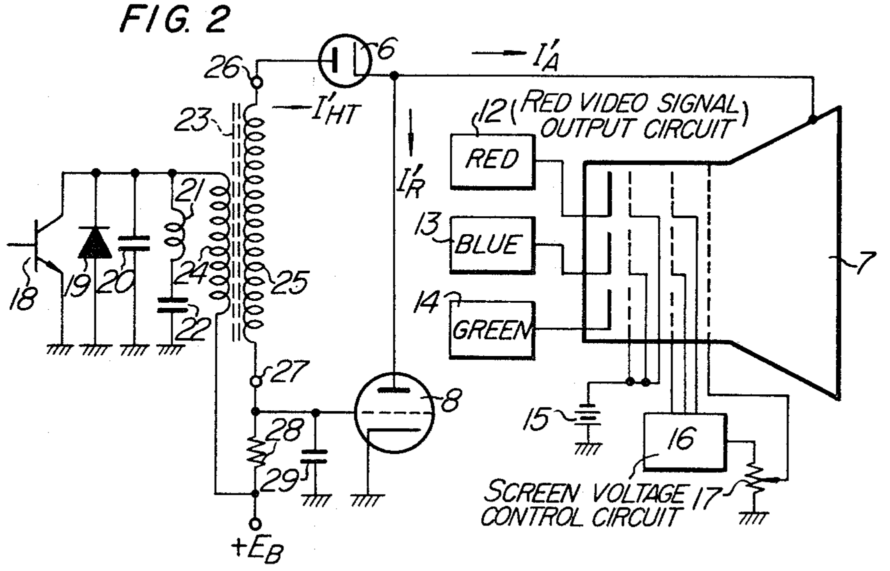
FIG. 2 is a circuit diagram showing a high voltage regulating circuit according to an embodiment of the present invention.

In FIG. 2, numeral 18 designates a horizontal output transistor; 19 a damper diode; 20 a parallel resonant capacitor; 21 a deflecting yoke; 22 a series resonant capacitor; 23 a flyback transformer. One end of a primary winding 24 of the flyback transformer 23 is connected with the collector of the horizontal output transistor 18 and the other end is connected with a positive potential terminal. One end 26 of a secondary winding 25 of the flyback transformer 23 is connected with the anode of a cathode ray tube 7 through a high voltage rectifier 6. The other end 27 of the secondary winding 25 is connected with the positive potential terminal through a resistor 28. The terminal 27 is connected with the grid of a shunt regulating tube 8 and is also grounded through a bypass capacitor 29.

The circuit of FIG. 2 may be considered in terms of a constant current circuit in which the average high voltage current $I'_{HT}$ flowing through the secondary winding 25 of the flyback transformer 23 is maintained constant by means of a negative feedback resistor 28. In this circuit, an increase in the anode current $I'_A$ results in a rise in the high voltage current $I'_{HT}$ with a consequent drop in the high voltage. The rise of the high voltage current $I'_{HT}$ increases the voltage drop across the resistor 28 so that the voltage across the terminal 27 decreases. This voltage at the terminal 27 is supplied to the grid of the shunt regulating tube 8 with a resultant decrease in the current $I'_R$ flowing through the shunt regulating tube 8. Thus, the current flowing through the shunt regulating tube 8 is decreased by an amount equal to the increase in the anode current $I'_A$, so that the high voltage current $I'_{HT}$ and hence the high voltage are always held constant.

Next, the fact that both the high voltage current $I'_{HT}$ and high voltage $E'_{HT}$ are always held constant in the high voltage regulating circuit of the present invention will be explained hereunder by means of formulas.

In the first place, if the cathode ray tube anode current $I'_A=0$, the current $I'_R$ $(=I'_{HT})$ flowing through the shunt regulating tube 8 is given by the following equation:

$$I_B=I'_{HT}=\frac{E_B-E'_{GK}}{R_2} \qquad (3)$$

where $E'_{GK}$ = the voltage between the grid and cathode of the shunt regulating tube 8, $R_2$ = the resistance value of the resistor 28, and $E_B$ = the positive voltage supplied to the junction point of the resistor 28 and the primary winding 24. Thus, if $E_B$ = 120 volts, $E'_{HT}$ = 20 kilovolts, the high voltage stable current range is selected to be $I'_A \doteqdot 0 \sim 1$ mA and 6BK4B is used for the shunt regulating tube 8, then $\mu$ = 2000 and $r_P$ = 10 megohms.

Now assuming that the current $I'_R$ flowing through the shunt regulating tube 8 is 1 milliampere, there is obtained $E_{GK}$ = −5 volts by substituting the aforesaid numerical values in the following general formula for determining the plate current of a vacuum tube:

$$I'_R=1/r_p\,(E'_{HT}+\mu E'_{GK}) \qquad 4$$

Then, since $I'_R=(E'_B-E'_{GK})/R_2$, substituting $I'R=1$ milliampere, $E_B=120$ volts and $E'_{GK}=-5$ volts in this equation gives $R_2=125$ kiloohms.

On the other hand, the value of the voltage $E'_{GK}$ when the shunt regulating tube 8 is cut off, that is, $I'_R = 0$, is given from the equation 4 as $E'_{GK} = -10$ volts.

Then, when $I'_R = 1$ milliampere, the anode current $I'_A$ is given by the equation:

$$I'_A = \frac{E_B - E'_{GK}}{R_2} - 1\,(mA) = 0 \qquad (5)$$

Thus, if $I'_R = 0$, that is, when the shunt regulating tube 8 is cut off, $I'_A = (E_B - E'_{GK})/R_2$. Substituting $E'_{GK} = -10$ volts in this equation, we obtain $I'_A = 1.04$ milliamperes $\doteq$ 1 milliampere.

As explained above, with the circuit of FIG. 2 constituting an embodiment of the present invention, a change of $I'_A$ from 0 to 1 milliampere results in a change of $I'_R$ from 1 to 0 milliampere with the corresponding change of $E'_{GK}$ from $-5$ to $-10$ volts. Since $\Delta E'_{GK} = 5$ volts, the corresponding change of the high voltage current $I'_{HT}$ is then given by the equation:

$$\Delta I'_{HT} = \frac{\Delta E'_{GK}}{R_2} = \frac{1}{25}\,mA \qquad (6)$$

It is thus understood that the change $\Delta I'_{HT}$ of the high voltage current is very small.

In other words, since the average high voltage current $I'HT = (E_B - E'_{GK})/R_2$ and $E_B >> |E'_{GK}|$ there is obtained $I'_{HT} \doteq E_B/R_2 \doteq 1$ milliampere and thus the average high voltage current $I'_{HT}$ is substantially a perfectly constant current.

To find the variation $\Delta I'_{HT}$ of the high voltage current $I'_{HT}$ in connection with the circuit of FIG. 2

$$\Delta E'_{GK} = -R \times \Delta I'_{HT} \qquad (7)$$

$$\Delta I'_{HT} = I'_A + \Delta I'_R \qquad (8)$$

$$\Delta E'_{HT} = -(R_S + R_2)\,\Delta I'_{HT} \qquad (9)$$

where $R_S = \Delta E'_{HT}/\Delta I'_{HT}$ is the internal resistance of the high voltage generating circuit, and thus from the equation 4

$$\Delta I'_R = \Delta I'_{HT}/r_P\,(\mu R_2 + R_2 + R_S) \qquad (10)$$

From the equations 8 and 9

$$\frac{\Delta E'_{HT}}{\Delta I'_A} = -\frac{R_S + R_2}{1 + \frac{1}{r_P}(R_2 + \mu R_2 + R_S)} \qquad (11)$$

Substituting the equation 9 in the equation 11, $\Delta I'_{HT}$ is given by the following equation:

$$\Delta I'_{HT} = \frac{\Delta I'_A}{1 + \frac{R_S}{r_P}\left(1 + R_2\frac{\mu + 1}{R_S}\right)} \qquad (12)$$

Figure 1:
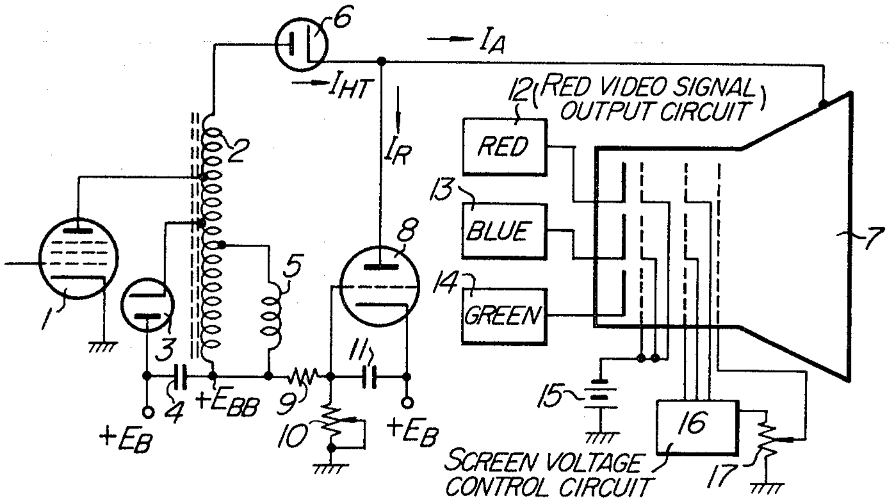
FIG. 1 PRIOR ART
FIG. 1 is a circuit diagram showing a conventional high voltage regulating circuit incorporating a shunt regulating tube.

Now assuming such practical time constants as $r_P = 10$ megohms, $\mu = 2000$, $R_S = 8$ megohms, $R_1 = R_G = 1.5$ megohms, $K = 0.015$ and $R_2 = 150$ kiloohms, comparison will be made between the variation $\Delta I_{HT}$ of the high voltage current in the prior art high voltage regulating circuit shown in FIG. 1 and the change $\Delta I'_{HT}$ of the high voltage current in the high voltage regulating circuit of the present invention shown in FIG. 2. By the equation 2, the variation of the high voltage current in the circuit of FIG. 1 is given by:

$$**\Delta I_{HT} = \Delta I_A/14 \qquad (13)$$

Similarly by the equation 12, the variation of the high voltage current in the circuit of FIG. 2 is given by:

$$\Delta I'_{HT} \doteq \Delta I'_A/32 \qquad (14)$$

It is now evident that when the degree of the variations $\Delta I_A$ and $\Delta I'_A$ of the anode currents $I_A$ and $I'_A$ are substantially the same as each other, the variation $\Delta I'_{HT}$ of the high voltage current according to the present invention is less than one half of the variation $\Delta I_{HT}$ of the high voltage current according to the prior art circuit of FIG. 1. By selecting a higher value for the positive reference potential so that the value of $R_2$ is made larger, $\Delta I'_{HT}$ can be reduced still further.

As will be apparent from the foregoing, the present invention has the following advantages as compared with the prior art high voltage regulating circuits:

1. A good high voltage regulating efficiency is achieved as is evident from the equations 13 and 14. In other words, the high voltage current changes to a smaller extent for the same degree of variation in the anode current.

2. The construction of the circuitry is simple and inexpensive to construct since the resistor 28 is inserted between the terminal 27 of the secondary winding 25 of the flyback transformer 23 and the positive potential terminal, so that the voltage at the terminal 27 is supplied as a control voltage to the grid of the shunt regulating tube 8 to thereby maintain good high voltage regulation.

3. The present invention can be incorporated in the horizontal deflection circuit of a television receiver which employs no boosting capacitor, since the control signal can be derived from the junction point of the secondary winding 25 of the flyback transformer 23 and the resistor 28 by simply connecting the resistor 28 with the winding 25.

For example, while the prior art high voltage regulating circuits have never been applicable to a transistorized horizontal deflection circuit employing no boosting capacitor, the present invention is capable of producing good results when incorporated in a transistorized horizontal deflection circuit utilizing no booster capacitor, although the present invention is undoubtedly applicable to a horizontal deflection circuit comprising a booster circuit.

4. According to the present invention, the required control signal for the shunt regulating tube 8 is different from the control signal (boost voltage) used with the conventional high voltage regulating circuits in that it does not change, even when subjected to the influence of changes in the characteristics of a horizontal output tube and damper tube due to ambient temperature conditions or with time, so that the high voltage can be maintained constant by means of the control signal which is proper at all times.

5. The gain of a negative feedback loop can be made larger because, due to the fact that the control signal for the shunt regulating tube 8 according to the present invention varies depending only on the high voltage current so that a proper control signal is always obtainable, it is possible to always provide a sufficient control signal by varying the values of $R_2$ and $E_B$ and moreover this control signal can be supplied to the grid of the shunt regulating tube 8 without attenuating the control signal by means of, for example, a voltage dividing resistor. This ensures a good high voltage regulating efficiency so that the high voltage changes little for fluctuations or changes with time in the characteristics of the shunt regulating tube 8. That is, according to the present invention, if $E_B >> |E'_{GK}|$ then the high voltage current $I'_{HT} = (E_B - E'_{GK})/R_2 \doteqdot E_B/R_2$, so that a change in the high voltage current may be expressed by the equation $\Delta I'_{HT} = \Delta E'_{GK}/R_2$, which is independent of the characteristics of the shunt regulating tube 8. Therefore, fluctuations and changes in the characteristics of the shunt regulating tube 8 can have little effect on the high voltage $E'_{HT}$.

6. Since the high voltage current practically depends only on the values of $E_B$ and $R_2$, both the high voltage current and the high voltage may be kept substantially constant under non-regulating condition. In other words, the variable resistor 10 ($R_G$) is not needed as was the case with the conventional circuits (Of course, it may be safely employed).

While the high voltage regulating circuit of the present invention shown in FIG. 2 has various advantages as described above, there is a certain limit to the regulating operation of the circuit of the present invention as was the case with any conventional high voltage regulating circuits. In other words, even with the circuit according to the present invention, if a beam current larger than the control limit is supplied so as to improve the brightness of the picture, it will no longer be possible to maintain the high voltage constant. The application of an excessively large beam current not only causes variations of the amplitude of the image, the degeneration of the focusing of the image and a shortened life for the cathode ray tube, but it also may result in an increased burden on the horizontal deflection output circuit which will cause damage to the horizontal output tube or the horizontal output transistor.

Figure 3:
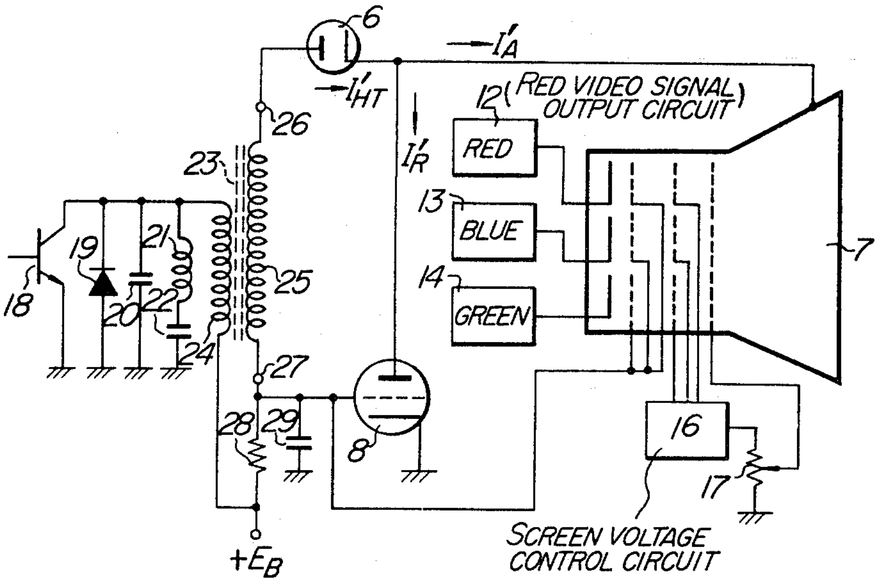
FIG. 3 is a circuit diagram showing a high voltage regulating circuit according to another embodiment of the present invention.

The high voltage regulating circuit shown in FIG. 3 is designed such that, in order to overcome the aforesaid deficiencies, a further increase in the beam current in a cathode ray tube is automatically checked when it exceeds a range of current controllable by the shunt regulating tube.

FIG. 3 is a circuit diagram showing another embodiment of this type of a high voltage regulating circuit. This figure illustrates by way of example a transistor horizontal deflection output circuit for a color television receiver, with the same numerals referring to the same component parts as shown in the circuit of FIG. 2. In FIG. 3, both the grid of a shunt regulating tube 8 and the first grid of a cathode ray tube 7 are connected with a low voltage side terminal 27 of a secondary winding 25 of a flyback transformer 23 so that they are at the same potential. The low voltage side terminal 27 is connected through a resistor 28 with a voltage supply $E_B$ which is more positive with respect to the cathode of the shunt regulating tube 8.

Figure 4A:
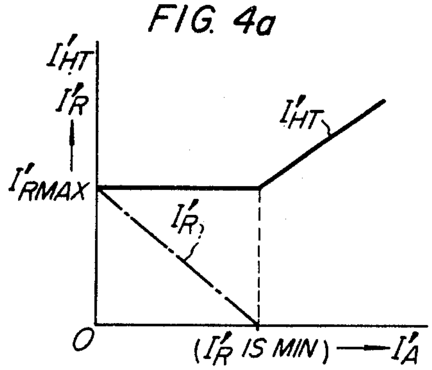
FIGS. 4*a* and 4*b* are characteristic diagrams for explaining the operation of the circuit shown in FIG. 3.
Figure 4B:
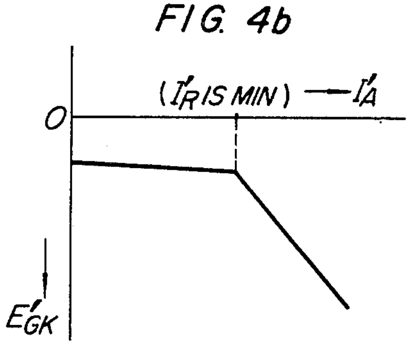

FIGS. 4a and 4b are diagrams for explaining the operation of the circuit shown in FIG. 3. In FIGS. 4a and 4b, $I'_A$ is the anode current of the cathode ray tube 7, and $I'_{HT}$ is the high voltage current flowing through the secondary winding 25 and it is the same as the current that flows through the resistor 28. $E'_{GK}$ is the voltage between the grid and the cathode of the shunt regulating tube 8. $I'_R$ is the average current flowing through the shunt regulating tube 8 and it attains a maximum value when $I'_A = 0$, with the maximum value $I'_{R\,max}$ being expressed as $I'_{R\,max} = I'_{HT}$. Since $E_B >> |E'_{GK}|$ over the range $0 \leqq I'_A \leqq I'_{R\,max}$, the following equation holds:

$$I'_{Rmax} = \frac{E_B - E'_{GK}}{R_2} \doteqdot \frac{E_B}{R_2} \qquad (15)$$

$I'_{HT} \leqq I'_{R\,max}$ indicates the normal operating range of the high voltage regulating circuit. As the anode current $I'_A$ increases to a point where $I'_A > I'_{R\,max}$, the shunt regulating tube 8 is cut off, that is, the point is reached where $I'_R = 0$, so that there will no longer be any high voltage regulating action and it is thus desirable to suppress the anode current within the range $I'_A \doteqdot I'_{R\,max}$. The characteristic diagram of FIG. 4a indicates these relations and $I'_{HT} = I'_A + I'_R$ is constant over the control range of the high voltage regulating circuit, i.e., $0 \leqq I'_A \leqq I'_{R\,max}$. The rise of $I'_A$ results in a decrease of $I'_R$ so that the anode current $I'_A$ attains its maximum current level within the control range, i.e., $I'_{HT} = I'_A$ when $I'_R = 0$. It is also seen that the increase of $I'_A$ beyond the control range results in a corresponding increase for $I'_{HT} = I'_A$.

Now considering the operation of the circuit in terms of $E'_{GK}$, the change of $E'_{GK}$ is very little over the range $0 \leqq I'_A \leqq I'_{R\,max}$ as shown in FIG. 4b. However, since $I'_R = 0$ when $I'_A > I'_{R\,max}$, then $\Delta E'_{GK} = -R_2 \times \Delta I'_A = -R_2 \times \Delta I'_{HT}$, so that $E'_{GK}$ rapidly turns into a large negative voltage. This negative voltage is applied to the first grid of the cathode ray tube 7 with the result that the flow of the anode current through the cathode ray tube 7 is limited to thereby control an excessively large flow of the anode current.

As described above in detail, the present invention has a remarkable industrial advantage in that the anode current of the cathode ray tube 7 can be effectively prevented from becoming excessively large by virtue of a simplified circuit construction.

We claim:

1. A high voltage regulating circuit comprising: a cathode ray tube having at least a cathode, a grid and an anode; high voltage generating means connected with said anode and comprising a flyback transformer for generating a flyback pulse and a high voltage rectifier connected with said flyback transformer for rectifying the flyback pulse generated across said flyback transformer, so that a high DC voltage is supplied to said anode of said cathode ray tube; a power source; current responsive means connected between said high voltage generating means and said power source for generating a control signal proportional to the current flowing through said generating means; control means having an input terminal, an output terminal connected with said anode of said cathode ray tube and a common terminal connected with a reference potential; and means for supplying said control signal to said input terminal of said control means for controlling the current flowing through said output terminal thereof, whereby said DC voltage supplied to said anode of said cathode ray tube is held constant.

2. A high voltage regulating circuit according to claim 1, wherein said current responsive means for generating said control signal comprises a resistor connected between said high voltage generating means and said power source.

3. A high voltage regulating circuit according to claim 2, wherein a control voltage generated across said resistor is supplied to said input terminal of said control means.

4. A high voltage regulating circuit comprising: a cathode ray tube having at least a cathode, a grid and an anode; high voltage generating means connected with said anode and comprising a flyback transformer for generating a flyback pulse and a high voltage rectifier connected with said flyback transformer for rectifying the flyback pulse generated across said transformer, so that a high DC voltage is supplied to said anode of said cathode ray tube; a power source; a resistor connected between said high voltage generating means and said power source for generating a control signal proportional to the current flowing therethrough; and a shunt regulating tube having a plate connected with said anode of said cathode ray tube, a cathode connected with a reference potential and a grid connected with said resistor so that said control signal is supplied thereto, whereby the current flow through said plate of said shunt regulating tube is controlled, and said DC voltage supplied to said anode of said cathode ray tube is held constant.

5. A high voltage regulating circuit comprising: a cathode ray tube having at least a cathode, a grid and an anode; high voltage generating means connected with said anode and comprising a flyback transformer for generating a flyback pulse and a high voltage rectifier connected with said flyback transformer for rectifying the flyback pulse generated across said transformer, so that high DC voltage is supplied to said anode of said cathode ray tube; a power source; current responsive means connected between said high voltage generating means and said power source for generating a control signal proportional to the current flowing through said high voltage generating means; control means having an input terminal, an output terminal connected with said anode of said cathode ray tube and a common terminal connected with a reference terminal; first first means for supplying said control signal to said input terminal of said control means for controlling current flow through said output terminal thereof so as to hold said DC voltage at a predetermined constant value; and second means for supplying said control signal to said grid of said cathode ray tube to prevent current flow through said anode thereof from exceeding a predetermined value.

6. A high voltage regulating circuit comprising: a cathode ray tube having at least a cathode, a grid and an anode; high voltage generating means connected with said anode and comprising a flyback transformer including a primary coil and a secondary coil for generating a flyback pulse and a high voltage rectifier connected with one of the terminals of said secondary coil, so that a high DC voltage is supplied to said anode of said cathode ray tube; a power source; a resistor connected between said power source and the other one of the terminals of said secondary coil for generating a control voltage proportional to the high voltage current flowing therethrough; and a shunt regulating tube having a plate connected with said anode of said cathode ray tube, a cathode connected with a reference potential and a grid connected with said resistor so that said control signal is supplied thereto, whereby the current flowing through said plate of said shunt regulating tube is controlled, and said DC voltage supplied to said anode of said cathode ray tube is maintained constant.

* * * * *